(12) United States Patent
Zhang

(10) Patent No.: US 9,350,592 B2
(45) Date of Patent: May 24, 2016

(54) DECOMPRESSING METHOD AND APPARATUS

(71) Applicant: HUAWEI TECHNOLOGIES CO., LTD., Shenzhen (CN)

(72) Inventor: Minqi Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 419 days.

(21) Appl. No.: 13/922,496

(22) Filed: Jun. 20, 2013

(65) Prior Publication Data

US 2013/0279522 A1    Oct. 24, 2013

Related U.S. Application Data

(63) Continuation of application No. PCT/CN2011/084293, filed on Dec. 20, 2011.

(30) Foreign Application Priority Data

Dec. 20, 2010  (CN) .......................... 2010 1 0602775

(51) Int. Cl.
    *H04L 29/06*  (2006.01)
(52) U.S. Cl.
    CPC ............ *H04L 29/0604* (2013.01); *H04L 69/04* (2013.01); *H04L 69/28* (2013.01)
(58) Field of Classification Search
    None
    See application file for complete search history.

(56) References Cited

U.S. PATENT DOCUMENTS 7,197,687 B2 *  3/2007  Imura ................... H04L 1/0083
                                                370/394
7,948,989 B2 *  5/2011  Kapoor ................. H04L 1/0079
                                                370/394

(Continued)

FOREIGN PATENT DOCUMENTS

CN         1489845 A     4/2004
CN       101107829 A     1/2008

(Continued)

OTHER PUBLICATIONS

International Search Report, dated Mar. 22, 2012, in corresponding International Application No. PCT/CN2011/084293 (4 PP.).

(Continued)

*Primary Examiner* — Kwang B Yao
*Assistant Examiner* — Adam Duda
(74) *Attorney, Agent, or Firm* — Staas & Halsey LLP

(57) ABSTRACT

A decompressing method and apparatus and belong to the field of communications. The method includes: receiving a compressed data packet and decompressing a sequence number compression code of the compressed data packet; obtaining a new reference sequence number according to time of receiving the compressed data packet, a buffered reference sequence number, reference time, and a unit sequence number time interval when a sequence number of the data packet fails to be decompressed because of successive packet losses; and re-decompressing the sequence number compression code of the data packet according to the new reference sequence number to obtain the sequence number of the data packet, where the reference sequence number is a sequence number of a last successfully decompressed data packet and the buffered reference time is time of receiving a compressed data packet, and the data packet is the last successfully decompressed data packet.

16 Claims, 4 Drawing Sheets

(56) References Cited

U.S. PATENT DOCUMENTS

| | | | |
|---|---|---|---|
| 2004/0073711 A1* | 4/2004 | Pelletier | H04L 69/04 709/247 |
| 2004/0088642 A1* | 5/2004 | Imura | H04L 1/0083 714/776 |
| 2006/0120352 A1* | 6/2006 | Agashe | H04L 69/04 370/352 |
| 2007/0258458 A1* | 11/2007 | Kapoor | H04L 1/0079 370/394 |
| 2008/0151901 A1* | 6/2008 | Yang | H04L 1/0079 370/394 |

FOREIGN PATENT DOCUMENTS

| | | |
|---|---|---|
| CN | 101411157 A | 4/2009 |
| EP | 1370019 A1 | 12/2003 |
| JP | 2002-94553 | 3/2002 |
| WO | WO 02/28017 A2 | 4/2002 |

OTHER PUBLICATIONS

C. Bormann et al., "Robust Header Compression (ROHC)", Network Working Group, Request for Comments: 3095, Standards Track, Jul. 2001, pp. 1-168.

* cited by examiner

DECOMPRESSING METHOD AND APPARATUS

CROSS-REFERENCE TO RELATED APPLICATIONS

This application is a continuation of International Application No. PCT/CN2011/084293, filed on Dec. 20, 2011, which claims priority to Chinese Patent Application No. 201010602775.8, filed on Dec. 20, 2010, both of which are hereby incorporated by reference in their entireties.

TECHNICAL FIELD

The present invention relates to the field of wireless communication technologies, and in particular, to a decompressing method and apparatus.

BACKGROUND

Header compression (RObust Header Compression, Rohc) is a mechanism that compresses various protocol headers to save transport resources. When a transmitter transmits successive data packets, the sequence number (Series number, Sn) in the protocol header of each data packet ascends, and therefore only a few fields are different in the Sns of adjacent data packets. When an Rohc compressor of the transmitter compresses the Sn of a data packet, the compressor compresses and encodes the fields that are different from the Sns of adjacent data packets to obtain the Sn compression code of the data packet and sends the Sn compression code of the data packet to a receiver.

An Rohc decompressor of the receiver receives the Sn compression code of the data packet and decompresses the Sn compression code of the data packet to obtain the Sn of the data packet. When many successive data packets are lost, the Sn of a data packet obtained by decompression is different from an original Sn of the data packet, thereby reducing accuracy in decompressing the Sn of the data packet.

SUMMARY

Embodiments of the present invention provide a decompressing method and apparatus, which can improve the accuracy in decompressing the sequence number of a data packet.

In one aspect, a decompressing method is provided, including:

receiving a compressed data packet and decompressing a sequence number compression code of the compressed data packet;

obtaining a new reference sequence number according to time of receiving the compressed data packet, a buffered reference sequence number, reference time, and a unit sequence number time interval when a sequence number of the data packet fails to be decompressed because of successive packet losses; and re-decompressing the sequence number compression code of the data packet according to the new reference sequence number to obtain the sequence number of the data packet;

where, the buffered reference sequence number is a sequence number of a last successfully decompressed data packet and the reference time is time of receiving a compressed data packet, and the data packet is the last successfully decompressed data packet.

In another aspect, a decompressing apparatus is provided, including:

a decompressing module, configured to receive a compressed data packet and decompress a sequence number compression code of the compressed data packet;

an obtaining module, configured to obtain a new reference sequence number according to time of receiving the compressed data packet, a buffered reference sequence number, reference time, and a unit sequence number time interval when the decompressing module fails to decompress a sequence number of the data packet because of successive packet losses; and a re-decompressing module, configured to re-decompress the sequence number compression code of the data packet according to the new reference sequence number obtained by the obtaining module to obtain the sequence number of the data packet;

where, the buffered reference sequence number is a sequence number of a last successfully decompressed data packet and the reference time is time of receiving a compressed data packet, where the data packet is the last successfully decompressed data packet.

A compressed data packet is received, a sequence number compression code of the compressed data packet is decompressed, and if the decompression fails because of successive packet losses, a new reference sequence number is obtained according to time of receiving the compressed data packet, a buffered reference sequence number, reference time, and a unit sequence number time interval, and the sequence number compression code of the data packet is re-decompressed according to the new reference sequence number. Even when the decompressor loses many successive data packets, the obtained new reference sequence number is located in the same code segment as the original sequence number of the data packet, so that the decompressed sequence number of the data packet is consistent with the original sequence number of the data packet, thereby improving the accuracy in decompressing the sequence number of the data packet.

BRIEF DESCRIPTION OF DRAWINGS

To describe the technical solutions of the embodiments of the present invention more clearly, the following briefly introduces the accompanying drawings required in the description of the embodiments. Apparently, the accompanying drawings illustrate only some exemplary embodiments of the present invention, and persons of ordinary skill in the art can derive other drawings from these drawings without creative efforts.

DESCRIPTION OF EMBODIMENTS

To make the objectives, technical solutions, and advantages of the present invention clearer, the following describes the present invention in detail with reference to the accompanying drawings. It is apparent that the embodiments described herein are only some embodiments but not all embodiments of the present invention. Based on the embodiments of the present invention, persons of ordinary skill in the art can derive other embodiments without creative efforts and such other embodiments all fall within the protection scope of the present invention.

When an Rohc compressor of a transmitter receives a data packet, the compressor first compresses the data packet and also compresses and encodes an Sn of the data packet during the compression process to obtain an Sn compression code, where the compressed data packet includes the Sn compression code of the data packet, and then the compressor sends the compressed data packet to a receiver.

An Rohc decompressor of the receiver receives the compressed data packet sent by the compressor, and decompresses the Sn compression code of the data packet in the compressed data packet. The decompressing the Sn compression code of the data packet by using the decompressing method provided by the present invention is specifically: using the Sn of a last successfully decompressed data packet as a reference Sn and decompressing the Sn compression code of the data packet according to the reference Sn to obtain the Sn of the data packet. For description purposes, the Sn of a data packet before compression is described as the original Sn of the data packet. If the original Sn of the data packet is located in the same code segment as the reference Sn, the Sn of the data packet obtained by decompression is consistent with the original Sn of the data packet, which means that the decompression is successful; if the original Sn of the data packet is located in a code segment different from that of the reference Sn, the Sn of the data packet obtained by decompression is inconsistent with the original Sn of the data packet, which means that the decompression fails.

When the decompressor fails to receive compressed data packets successively sent by the compressor in a period of time after the decompressor receives the last successfully decompressed data packet and before the decompressor receives the data packet, that is, the decompressor encounters successive data packet losses. When the decompressor encounters successive data packet losses, it is possible that the original Sn of the data packet is located in a code segment different from that of the reference Sn, and as a result, the compression fails. In this case, the decompressor needs to restore the Sn of the data packet to obtain the Sn of the data packet.

Figure 1:
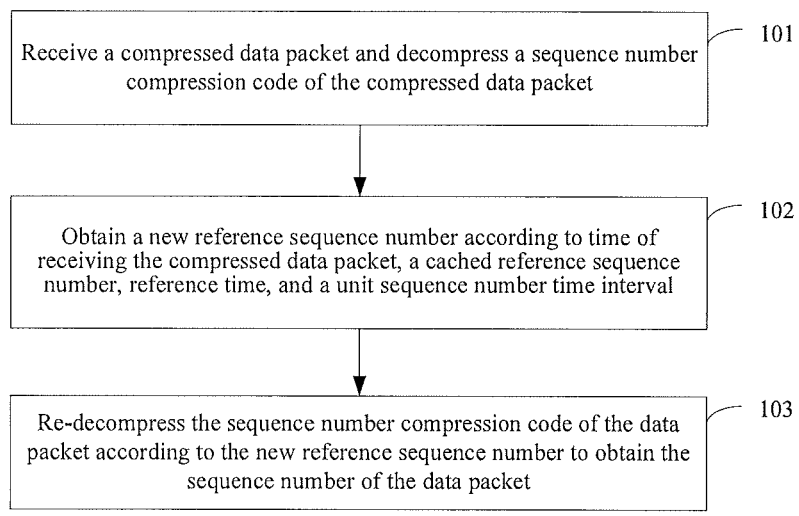
FIG. 1 is a flowchart of a decompressing method according to Embodiment 1 of the present invention.

As shown in FIG. 1, an embodiment of the present invention provides a decompressing method, including:

Step 101: Receive a compressed data packet and decompress a sequence number compression code of the compressed data packet.

Step 102: Obtain a new reference sequence number according to time of receiving the compressed data packet, a buffered reference sequence number, reference time, and a unit sequence number time interval when a sequence number of the data packet fails to be decompressed because of successive packet losses.

Step 103: Re-decompress the sequence number compression code of the data packet according to the new reference sequence number to obtain the sequence number of the data packet.

The buffered reference sequence number is a sequence number of a last successfully decompressed data packet and the reference time is the time of receiving the compressed data packet, and the data packet is the last successfully decompressed data packet.

In the embodiment of the present invention, a compressed data packet is received, a sequence number compression code of the compressed data packet is decompressed, and if the decompression fails because of successive packet losses, a new reference sequence number is obtained according to time of receiving the compressed data packet, a buffered reference sequence number, reference time, and a unit sequence number time interval, and the sequence number compression code of the data packet is decompressed according to the new reference sequence number. Even when the decompressor loses many successive data packets, the obtained new reference sequence number is located in the same code segment as the original sequence number of the data packet, so that the decompressed sequence number of the data packet is consistent with the original sequence number of the data packet, thereby improving the accuracy in decompressing the sequence number of the data packet.

An embodiment of the present invention provides another decompressing method. In the present embodiment, when a compressor receives a data packet, the compressor compresses the data packet and compresses and encodes an Sn of the data packet in the compression process to obtain an Sn compression code of the data packet, where the compressed data packet includes the Sn compression code of the data packet, and sends the compressed data packet to a decompressor. The decompressor receives the compressed data packet and decompresses the Sn compression code of the data packet included in the compressed data packet by using the decompressing method provided by the present embodiment, and when the decompressor fails to decompress the Sn of the data packet because of successive data packet losses, the decompressor may also restore the Sn of the data packet.

Figure 2:
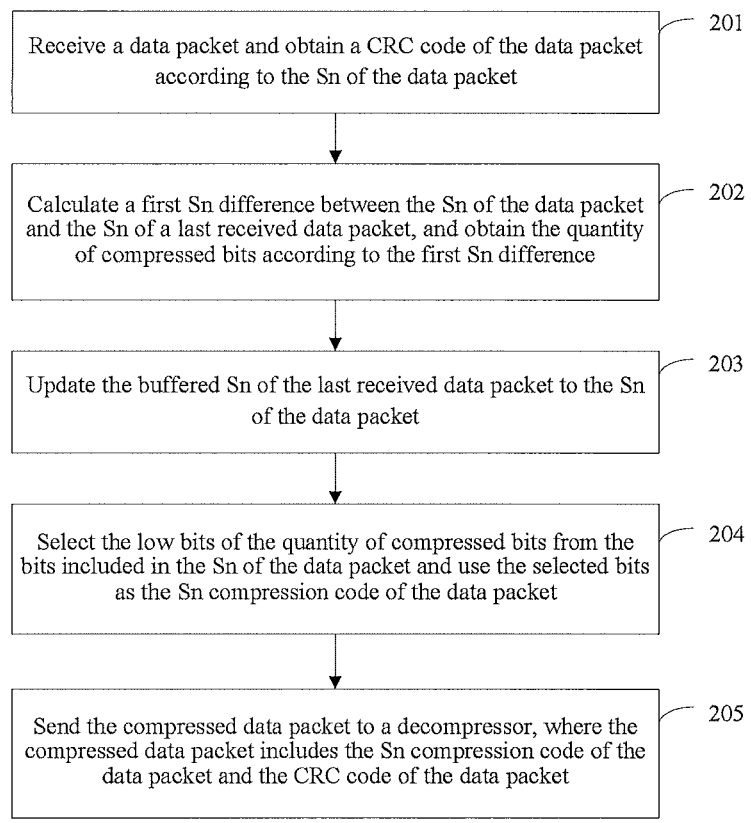
FIG. 2 is a flowchart in which a decompressor decompresses an Sn of a data packet according to Embodiment 2 of the present invention.

First, in the present embodiment, when the compressor receives a data packet, the compressor compresses and encodes an Sn of the data packet in the process of compressing the data packet to obtain an Sn compression code of the data packet. Referring to FIG. 2, a procedure in which the compressor compresses and encodes the Sn of the data packet during the process of compressing the data packet includes the following steps 201-205:

Step 201: Receive a data packet and obtain a cyclic redundancy check (Cyclic Redundancy Check, CRC) code of the data packet according to an Sn of the data packet.

For example, it is assumed that: the Sn of the data packet received by the compressor is 101, a binary code of the Sn of the data packet is "1100101", and the CRC code of the data packet obtained according to the Sn "1100101" of the data packet is "CRC1".

Step 202: Calculate a first Sn difference between the Sn of the data packet and the Sn of a last received data packet, and obtain the quantity of compressed bits according to the first Sn difference.

The obtaining the quantity of compressed bits according to the first Sn difference may include counting the quantity of bits included by the first Sn difference and using the counted quantity as the quantity of compressed bits.

The Sn of the last received data packet is buffered by the compressor in advance.

For example, it is assumed that the Sn of the last received data packet buffered by the compressor is "99". Then, the calculated first Sn difference between the obtained Sn "101" of the data packet and the Sn "99" of the last received data packet is "2", where the binary code of the first Sn difference "2" is "10", and the counted quantity of bits included by the first Sn difference is 2, where the counted quantity is used as the quantity of compressed bits.

Step 203: Update the buffered Sn of the last received data packet to the Sn of the data packet.

For example, the buffered Sn "99" of the last received data packet is updated to the Sn "101" of the data packet.

Step 204: Select the low bits of the quantity of compressed bits from the bits included in the Sn of the data packet and use the selected bits as the Sn compression code of the data packet.

For example, the low bits of the quantity of compressed bits are selected from the bits "1100101" included in the Sn "101" of the data packet, which means selecting the low 2 bits "01" and using the selected bits "01" as the Sn compression code of the data packet.

The execution sequence of step 203 and step 204 is not limited and the two steps may be executed simultaneously.

Assuming that the quantity of compressed bits is N, 2 to the $N^{th}$ power is the length of a code segment. If the Sn difference of two data packets is smaller than the length of the code segment, the Sns of the two data packets are considered to be located in one code segment. For example, when the quantity of compressed bits is 2, the length of the corresponding code segment is 4. Because the difference between the Sn "101" of the data packet and the Sn "99" of the last received data packet is 2, the Sn of the data packet and the Sn of the last received data packet are located in one code segment.

The compressed data packet obtained after the compressor compresses the data packet includes the Sn compression code and the CRC code of the data packet.

Step 205: Send the compressed data packet to a decompressor, where the compressed data packet includes the Sn compression code of the data packet and the CRC code of the data packet.

Figure 3:
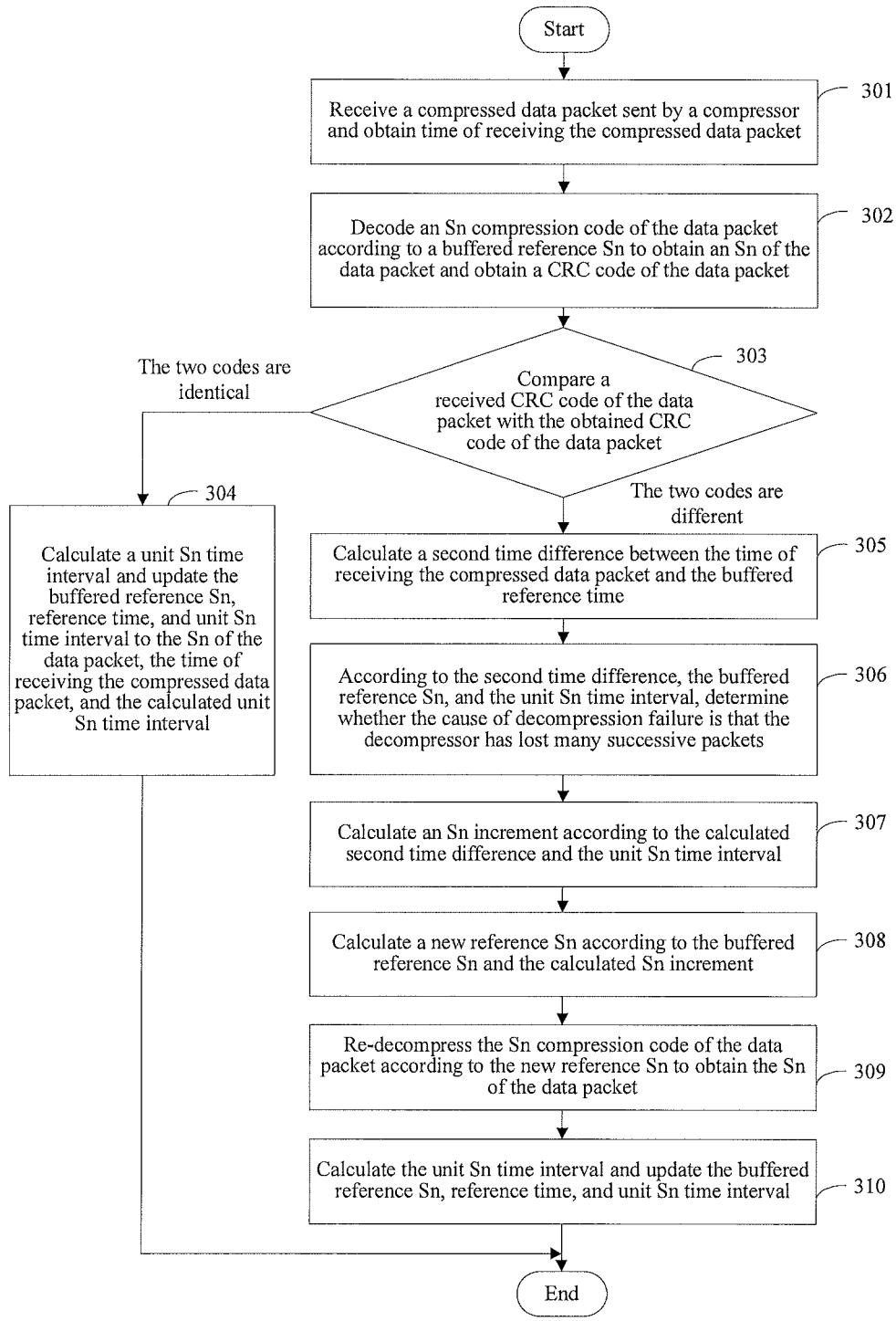
FIG. 3 is a flowchart of another decompressing method according to Embodiment 2 of the present invention.

Then, the decompressor receives the compressed data packet sent by the compressor, and with respect to the Sn compression code of the data packet and the CRC code of the data packet in the compressed data packet, decompresses the Sn compression code of the data packet by using the decompressing method provided in the present embodiment. Referring to FIG. 3, a procedure in which the decompressor decompresses the Sn compression code of the received data packet includes the following steps 301-310:

Step 301: Receive the compressed data packet sent by the compressor, where the compressed data packet includes the Sn compression code of the data packet and the CRC code of the data packet, and obtain the time of receiving the compressed data packet.

For example, the Sn compression code of the data packet received from the compressor is "01" and the CRC code of the data packet received from the compressor is "CRC1" and the obtained time of receiving the compressed data packet is "400 seconds", which means that the Sn compression code of the data packet is received at the $400^{th}$ second.

Step 302: Decode the Sn compression code of the data packet according to a buffered reference Sn to obtain the Sn of the data packet, and obtain the CRC code of the data packet according to the Sn of the data packet.

Specifically, the decompressor determines the quantity of compressed bits according to the quantity of bits included by the Sn compression code of the data packet; calculates the length of a code segment according to the quantity of compressed bits; determines Sns starting from the buffered reference Sn, with a difference from the buffered reference Sn being smaller than the length of a code segment; matches the Sn compression code of the data packet respectively with the low bits of the quantity of compressed bits of the buffered reference Sn and the low bits of the quantity of compressed bits of each determined Sn to obtain the same Sn, where the obtained Sn is the decompressed Sn of the data packet; and obtains the CRC code according to the decompressed Sn of the data packet.

Because the difference between every determined Sn and the buffered reference Sn is smaller than the length of the code segment, every determined Sn is located in the same code segment as the buffered reference Sn, where the buffered reference Sn is the Sn of the data packet last successfully decompressed by the decompressor. In addition, the decompressor also buffers reference time and the unit Sn time interval, where the reference time is the time when the last successfully decompressed data packet is received. In the present embodiment, it is assumed that the buffered reference time is "354 seconds" and the unit Sn time interval is "2 seconds", where the unit Sn is a difference between two adjacent Sns, for example, $Sn_m$ and $Sn_{m+1}$ are two adjacent Sns and the unit Sn is the difference between $Sn_{m+1}$ and $Sn_m$.

For example, it is assumed that the Sn of the last successfully decompressed data packet buffered by the decompressor is "87", which means that the buffered reference Sn is "87", whose binary code is "1010111". According to the Sn compression code "01" of the data packet, the quantity of compressed bits is determined to be "2", and 2 to the second power is the length of a code segment and therefore the length of a code segment calculated according to the quantity of compressed bits 2 is 4. Then, starting from the buffered reference Sn "87", the decompressor determines that the differences of Sns "88", "89", and "90" from the buffered reference Sn "87" are all smaller than the length 4 of a code segment, where the buffered reference Sn "87" and the determined Sns "88", "89", and "90" are located in one code segment and the binary codes of "88", "89", and "90" are respectively "1011000", "1011001", and "1011010". The low 2 bits included by the buffered reference Sn "87" and the determined Sns "88", "89", and "90" are respectively "11", "00", "01", and "10". The decompressor matches the Sn compression code "01" of the data packet respectively with the low 2 bits of the buffered reference Sn "87" and the determined Sns "88", "89", and "90", which means that the decompressor matches the Sn compression code "01" of the data packet respectively with "11", "00", "01", and "10" to obtain the same Sn "89" and uses the obtained Sn "89" as the Sn of the data packet. According to the Sn "89" of the data packet, the decompressor obtains the CRC code "CRC2".

Step 303: Compare the received CRC code of the data packet with the obtained CRC code of the data packet; if the two codes are identical, the decompression is successful and step 304 is executed; if the two codes are different, the decompression fails and step 305 is executed.

The CRC code is obtained according to the Sn. If the CRC codes of two Sns are different, the two Sns are different.

For example, if the decompressor compares the received "CRC1" of the data packet with the obtained "CRC2" and finds that the two codes are different, the decompressed Sn of the data packet is different from the original Sn of the data packet, which means that the decompression fails, and then step 305 is executed.

Step 304: Calculate the unit Sn time interval and update the buffered reference Sn, reference time, and unit Sn time interval to the Sn of the data packet, the time of receiving the compressed data packet, and the calculated unit Sn time interval, and end the operation.

The calculating the unit Sn time interval is specifically: calculating a first time difference between the time of receiving the compressed data packet and the reference time, calculating a second Sn difference between the decompressed Sn of the data packet and the buffered reference Sn, and calculating the unit Sn time interval according to the calculated first time difference and second Sn difference.

Step 305: Calculate a second time difference between the time of receiving the compressed data packet and the reference time.

For example, the time of receiving the compressed data packet is 400 seconds and the reference time is 354 seconds. Then, the calculated second time difference between the time of receiving the compressed data packet and the reference time is 46 seconds.

Step 306: According to the second time difference, the buffered reference Sn, and the unit Sn time interval, determine whether the cause of decompression failure is that the decompressor has lost many successive packets, and if so, execute step 307.

Specifically, the decompressor calculates a third Sn difference between the decompressed Sn of the data packet and the buffered reference Sn, and calculates a third time difference according to the third Sn difference and the unit Sn time interval. If the difference between the second time difference and the third time difference exceeds a preset threshold, the decompressor determines that the cause of decompression failure is that the decompressor has lost many successive packets.

It is assumed that the preset threshold is 20. For example, the third Sn difference calculated according to the decompressed Sn "89" of the data packet and the buffered reference Sn "87" is 2. The third time difference calculated according to the third Sn difference 2 and the unit Sn time interval 2 is 4. The difference between the second time difference 46 and the third time difference 4 exceeds the preset threshold 20. Then, the decompressor determines that the decompressor fails to receive many data packets successively sent by the compressor in the period from the 354$^{th}$ second to the 400$^{th}$ second, which means that the decompressor encounters successive data packet losses.

The preset threshold is an empirical value obtained according to experiments.

Step 307: Calculate an Sn increment according to the calculated second time difference and the unit Sn time interval.

Specifically, the calculated second time difference is divided by the unit Sn time interval to obtain the Sn increment.

For example, the calculated second time difference 46 is divided by the unit Sn time interval 2 to obtain the Sn increment 23.

Step 308: Calculate a new reference Sn according to the buffered reference Sn and the calculated Sn increment.

Specifically, the buffered reference Sn and the calculated Sn increment are added to obtain the new reference Sn.

For example, the buffered reference Sn "87" and the calculated Sn increment "23" are added to obtain the new reference Sn "100", where the binary code of the new reference Sn "100" is "1100100".

The new reference Sn obtained in this step is located in the same code segment as the original Sn of the data packet.

Step 309: Re-decompress the Sn compression code of the data packet according to the new reference Sn to obtain the Sn of the data packet.

Specifically, the decompressor determines Sns starting from the new reference Sn, with a difference from the new reference Sn being smaller than the length of a code segment, and matches the Sn compression code of the data packet respectively with the low bits of the quantity of compressed bits of each Sn in the code segment where the new reference Sn is located to obtain the same Sn, where the obtained Sn is the re-decompressed Sn of the data packet.

For example, the length of the code segment obtained in step 202 is 4; the decompressor determines, according to the length 4 of the code segment, that Sns starting from the new reference Sn "100", with a difference from the new reference Sn "100" being smaller than the code segment length 4, are respectively "101", "102", and "103", where the new reference Sn "100" and the determined "101", "102", and "103" are located in one code segment and the binary codes of "101", "102", and "103" are respectively "1100101", "1100110", and "1100111". The low 2 bits of the new reference Sn "100" and the determined Sns "101", "102", and "103" are respectively "00", "01", "10", and "11". The decompressor matches the Sn compression code "01" of the data packet respectively with the low 2 bits included by the four Sns in the code segment where the new reference Sn "100" is located to obtain the same Sn "101", and uses the obtained Sn "101" as the Sn of the data packet.

Step 310: Calculate the unit Sn time interval and update the buffered reference Sn, reference time, and unit Sn time interval to the re-decompressed Sn of the data packet, the time of receiving the compressed data packet, and the calculated unit Sn time interval, and end the operation.

The calculating the unit Sn time interval is specifically: calculating a fourth Sn difference between the re-decompressed Sn of the data packet and the buffered reference Sn; and calculating the unit Sn time interval according to the second time difference and the fourth Sn difference.

For example, the calculated fourth Sn difference between the re-decompressed Sn "101" of the data packet and the reference Sn "87" is "24". The unit Sn time interval calculated according to the second time difference "46" and the calculated fourth Sn difference "24" is "1.9167 seconds". The decompressor updates the buffered reference Sn "87", reference time "354 seconds", and the unit Sn time interval "2 seconds" respectively to the re-decompressed Sn "101" of the data packet, time "400 seconds" of receiving the compressed data packet, and the calculated unit Sn time interval "1.9167 seconds".

Further, the decompressor may also obtain a CRC code according to the re-decompressed Sn of the data packet, and compare the obtained CRC code with the received CRC code of the data packet. If the two codes are identical, the re-decompression is successful; if the two codes are different, the re-decompression fails, and the operation is ended.

In the embodiment of the present invention, the decompressor receives a compressed data packet, decompresses a sequence number compression code of the compressed data packet, and if the decompression fails because of successive packet losses, obtains a new reference sequence number according to time of receiving the compressed data packet, a reference Sn buffered in advance, reference time, and a unit Sn time interval, and decompresses the Sn compression code of the data packet according to the new reference Sn. Even when the decompressor encounters many successive data packet losses, the obtained new reference Sn is located in the same code segment as the original Sn of the data packet, so that the decompressed Sn of the data packet is consistent with the original Sn of the data packet, thereby improving the accuracy in decompressing the Sn of the data packet.

Figure 4:
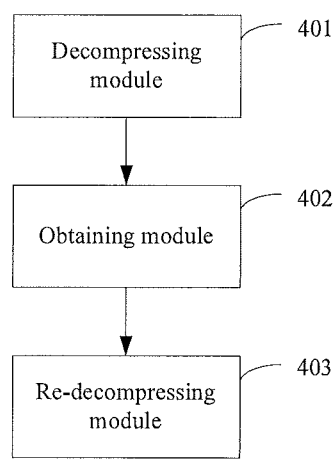
FIG. 4 is a schematic diagram of a decompressing apparatus according to Embodiment 3 of the present invention.

As shown in FIG. 4, an embodiment of the present invention provides a decompressing apparatus, including:

a decompressing module 401, configured to receive a compressed data packet and decompress a sequence number compression code of the compressed data packet;

an obtaining module 402, configured to obtain a new reference sequence number according to time of receiving the compressed data packet, a buffered reference sequence number, reference time, and a unit sequence number time interval when the decompressing module 401 fails to decompress a sequence number of the data packet because of successive packet losses; and a re-decompressing module 403, configured to re-decompress the sequence number compression code of the data packet according to the new reference sequence number obtained by the obtaining module 402 to obtain the sequence number of the data packet.

The buffered reference sequence number is a sequence number of a last successfully decompressed data packet and the reference time is the time of receiving the compressed data packet, and the data packet is the last successfully decompressed data packet.

The obtaining module 402 is configured to calculate a time difference between the time of receiving the compressed data packet and the reference time; calculate a sequence number increment according to the calculated time difference and the unit sequence number time interval; and calculate the new reference sequence number according to the reference sequence number and the sequence number increment.

Further, the apparatus further includes:

a first updating module, configured to obtain the unit sequence number time interval according to the calculated time difference, the sequence number of the data packet, and the reference sequence number; and update the buffered unit sequence number time interval to the obtained unit sequence number time interval.

The first updating module is specifically configured to calculate a sequence number difference according to the sequence number of the data packet and the reference sequence number; calculate the unit sequence number time interval according to the calculated time difference and the calculated sequence number difference; and update the buffered unit sequence number time interval to the obtained unit sequence number time interval.

Further, the apparatus further includes:

a second updating module, configured to update the buffered reference sequence number to the sequence number of the data packet and update the reference time to the time of receiving the compressed data packet.

In the embodiment of the present invention, a compressed data packet is received, a sequence number compression code of the compressed data packet is decompressed, and if the decompression fails because of successive packet losses, a new reference sequence number is obtained according to time of receiving the compressed data packet, a buffered reference sequence number, reference time, and a unit sequence number time interval, and the sequence number compression code of the data packet is decompressed according to the new reference sequence number. Even when the decompressor loses many successive data packets, the obtained new reference sequence number is located in the same code segment as the original sequence number of the data packet, so that the decompressed sequence number of the data packet is consistent with the original sequence number of the data packet, thereby improving the accuracy in decompressing the sequence number of the data packet.

It should be noted that the above functional modules are only described for exemplary purposes when the decompressing apparatus provided in the embodiment decompresses a sequence number compression code of the data packet. In practice, the functions may be allocated to different functional modules according to specific needs, which means that the internal structure of the apparatus is divided to different functional modules to complete all or a portion of the above described functions. In addition, the decompressing apparatus provided in the embodiment is based on the same conception as the decompressing method in the foregoing embodiment. The specific implementation of the apparatus is detailed in the method embodiment, and is not repeated herein.

All or a portion of the technical solutions provided in the embodiments may be implemented through software programming. The software program is stored in a readable storage medium, such as a hard disk, an optical disk, or a floppy disk of a computer.

The above descriptions are merely preferred embodiments of the present invention, but are not intended to limit the present invention. Any modification, equivalent replacement, or improvement made without departing from the spirit and principle of the present invention should fall within the scope of the present invention.

What is claimed is:

1. A decompressing method, comprising:

receiving a compressed data packet and decompressing a sequence number compression code of the compressed data packet;

obtaining a new reference sequence number according to a time of receiving the compressed data packet, a buffered reference sequence number, reference time, and a unit sequence number time interval when a sequence number of the data packet fails to be decompressed because of successive packet losses; and re-decompressing the sequence number compression code of the data packet according to the new reference sequence number to obtain the sequence number of the data packet;

wherein, the buffered reference sequence number is a sequence number of a last successfully decompressed data packet and the reference time is time of receiving a compressed data packet, and the data packet is the last successfully decompressed data packet.

2. The method according to claim 1, after the re-decompressing the sequence number compression code of the data packet according to the new reference sequence number to obtain the sequence number of the data packet, further comprising:

updating the buffered reference sequence number to the sequence number of the data packet and updating the reference time to the time of receiving the compressed data packet.

3. The method according to claim 1, wherein the obtaining a new reference sequence number according to time of receiving the compressed data packet, a buffered reference sequence number, reference time, and a unit sequence number time interval comprises:

calculating a time difference between the time of receiving the compressed data packet and the reference time;

calculating a sequence number increment according to the time difference and the unit sequence number time interval; and calculating the new reference sequence number according to the buffered reference sequence number and the sequence number increment.

4. The method according to claim 3, after the re-decompressing the sequence number compression code of the data packet according to the new reference sequence number to obtain the sequence number of the data packet, further comprising:

updating the buffered reference sequence number to the sequence number of the data packet and updating the reference time to the time of receiving the compressed data packet.

5. The method according to claim 3, after the re-decompressing the sequence number compression code of the data packet according to the new reference sequence number to obtain the sequence number of the data packet, further comprising:
- obtaining the unit sequence number time interval according to the time difference, the sequence number of the data packet, and the buffered reference sequence number; and
- updating the buffered unit sequence number time interval to the obtained unit sequence number time interval.

6. The method according to claim 5, after the re-decompressing the sequence number compression code of the data packet according to the new reference sequence number to obtain the sequence number of the data packet, further comprising:
- updating the buffered reference sequence number to the sequence number of the data packet and updating the reference time to the time of receiving the compressed data packet.

7. The method according to claim 5, wherein the obtaining the unit sequence number time interval according to the time difference, the sequence number of the data packet, and the buffered reference sequence number comprises:
- calculating a sequence number difference according to the sequence number of the data packet and the buffered reference sequence number; and
- calculating the unit sequence number time interval according to the time difference and the sequence number difference.

8. The method according to claim 7, after the re-decompressing the sequence number compression code of the data packet according to the new reference sequence number to obtain the sequence number of the data packet, further comprising:
- updating the buffered reference sequence number to the sequence number of the data packet and updating the reference time to the time of receiving the compressed data packet.

9. A decompressing apparatus, comprising:
- a decompressing module, configured to receive a compressed data packet and decompress a sequence number compression code of the compressed data packet;
- an obtaining module, configured to obtain a new reference sequence number according to time of receiving the compressed data packet, a buffered reference sequence number, reference time, and a unit sequence number time interval when the decompressing module fails to decompress a sequence number of the data packet because of successive packet losses; and
- a re-decompressing module, configured to re-decompress the sequence number compression code of the data packet according to the new reference sequence number obtained by the obtaining module to obtain the sequence number of the data packet;

wherein, the buffered reference sequence number is a sequence number of a last successfully decompressed data packet and the reference time is time of receiving a compressed data packet, and the data packet is the last successfully decompressed data packet.

10. The apparatus according to claim 9, further comprising:
- a second updating module, configured to update the buffered reference sequence number to the sequence number of the data packet and update the reference time to the time of receiving the compressed data packet.

11. The apparatus according to claim 9, wherein:
the obtaining module is configured to calculate a time difference between the time of receiving the compressed data packet and the buffered reference time, calculate a sequence number increment according to the time difference and the unit sequence number time interval, and calculate the new reference sequence number according to the buffered reference sequence number and the sequence number increment.

12. The apparatus according to claim 11, further comprising:
- a second updating module, configured to update the buffered reference sequence number to the sequence number of the data packet and update the reference time to the time of receiving the compressed data packet.

13. The apparatus according to claim 11, further comprising:
- a first updating module, configured to obtain the unit sequence number time interval according to the time difference, the sequence number of the data packet, and the buffered reference sequence number, and update the buffered unit sequence number time interval to the obtained unit sequence number time interval.

14. The apparatus according to claim 13, further comprising:
- a second updating module, configured to update the buffered reference sequence number to the sequence number of the data packet and update the reference time to the time of receiving the compressed data packet.

15. The apparatus according to claim 13, wherein:
the first updating module is configured to calculate a sequence number difference according to the sequence number of the data packet and the buffered reference sequence number, calculate the unit sequence number time interval according to the time difference and the sequence number difference, and update the buffered unit sequence number time interval to the obtained unit sequence number time interval.

16. The apparatus according to claim 15, further comprising:
- a second updating module, configured to update the buffered reference sequence number to the sequence number of the data packet and update the reference time to the time of receiving the compressed data packet.

* * * * *